US006544134B2

(12) United States Patent
Ohyama et al.

(10) Patent No.: US 6,544,134 B2
(45) Date of Patent: Apr. 8, 2003

(54) BELT TYPE TRANSMISSION

(75) Inventors: Takashi Ohyama, Saitama (JP); Shinji Kuga, Saitama (JP); Tetsuaki Maeda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 26 days.

(21) Appl. No.: 09/821,076

(22) Filed: Mar. 30, 2001

(65) Prior Publication Data

US 2001/0029215 A1 Oct. 11, 2001

(30) Foreign Application Priority Data

Mar. 31, 2000 (JP) ........................................ 2000-098862

(51) Int. Cl.[7] .............................................. B62J 13/00
(52) U.S. Cl. ............................................ 474/144; 474/8
(58) Field of Search ........................... 474/8, 144, 145, 474/146

(56) References Cited

U.S. PATENT DOCUMENTS

| 2,189,294 A | * | 2/1940 | Pfleger ..................... 474/146 |
| 2,207,219 A | * | 7/1940 | Heyer ...................... 474/146 |
| 2,342,941 A | * | 2/1944 | Johnson et al. ............. 474/146 |
| 2,433,150 A | * | 12/1947 | Palm ....................... 474/146 |
| 2,731,845 A | * | 1/1956 | McGihon .................... 474/146 |
| 2,944,433 A | * | 7/1960 | Myers ...................... 248/656 |
| 4,494,623 A | * | 1/1985 | Kurata et al. ............... 180/230 |
| 4,531,928 A | * | 7/1985 | Ikenoya .................... 180/229 |
| 6,267,700 B1 | * | 7/2001 | Takayama ................... 474/144 |
| 6,398,683 B1 | * | 6/2002 | Fukuda ..................... 180/219 |

FOREIGN PATENT DOCUMENTS

JP          60236887         11/1985

* cited by examiner

Primary Examiner—Christopher P. Schwartz
Assistant Examiner—Devon Kramer
(74) Attorney, Agent, or Firm—Birch, Stewart, Kolasch & Birch, LLP (57) ABSTRACT

A belt type transmission improves the durability of a support portion of a driven shaft by reducing a load acting on a driven shaft, and improves the durability of the belt and reduces noise by suppressing vibration of a driven pulley. The belt type transmission includes a driven pulley having a fixed pulley piece and a movable pulley piece fitted to a driven shaft. The fixed pulley piece is rotatably supported, respectively, on the driven shaft and a bearing holder, being a constructional element of a transmission case. The bearing holder has a size overlapping only the driven pulley, and is coupled to a left case, which is a constructional element of the transmission case, in the vicinity of the driven pulley. As a result, the rigidity for supporting the fixed pulley piece on the driven side can be increased, thereby enabling suppression of vibration by the driven pulley.

20 Claims, 7 Drawing Sheets

BELT TYPE TRANSMISSION

BACKGROUND OF THE INVENTION

1. Field of the Invention

The present invention relates to a belt type transmission used in a transmission of, for example, a motorcycle, with the speed thereof being automatically changed. More specifically, the present invention relates to a support structure of a fixed pulley piece of a driven pulley of the belt type transmission.

2. Description of the Background Art

A motorcycle comprising a V-belt type transmission is heretofore disclosed in Japanese Patent Publication No. Hei 5-47437. In this transmission, a V-pulley on the driven side, to which power from a V-pulley on the driving side fitted to a crankshaft is transmitted via a V-belt, is rotatably supported on a support shaft that is pivotally supported rotatably at the opposite ends on an outside wall of a transmission case having the transmission built therein and on an inside wall towards the rear wheel. That is to say, of a fixed pulley and a movable pulley constituting the V-pulley on the driven side, the fixed pulley is provided with a support barrel secured thereon, and the opposite ends of the support barrel are rotatably supported on the support shaft via a pair of bearings, to thereby make the fixed pulley rotatable with respect to the support shaft.

However, with the conventional transmission, load from the driven pulley is imposed only on the support shaft (driven shaft). As a result, a large load acts on the support portion of the transmission case that rotatably supports the support shaft, and hence the support portion is likely to wear out, and there is room for improvement in view of the durability.

SUMMARY OF THE INVENTION

The invention of this application has been completed in view of the above situation, and it is an object of the invention according to a first aspect to reduce the load acting on the driven shaft to improve the durability of the support portion of the driven shaft. It is also an object of the invention according to a second aspect to improve the durability of the bearing supporting the fixed pulley piece on the driven side. Moreover, it is an object of the invention according to a third aspect to suppress vibration of the driven pulley to thereby improve the durability of the belt and reduce noise. Finally, an object of the invention according to a fourth aspect is to prevent the transmission case from becoming large.

The invention according to the first aspect of this application is a belt type transmission comprising a driving pulley having a fixed pulley piece and a movable pulley piece and fitted to a driving shaft; a driven pulley having a fixed pulley piece and a movable pulley piece and fitted to a driven shaft; and a belt entrained between the driving pulley and the driven pulley for transmitting the power of the driving shaft to the driven shaft, with the driven shaft housed in a rotatably supported transmission case, wherein the fixed pulley piece on the driven side is rotatably supported, respectively, on the driven shaft and the transmission case.

According to the invention of the first aspect, of two places where the fixed pulley piece on the driven side is rotatably supported, one is the transmission case. Therefore, a part of the load from the driven pulley, which has been heretofore imposed only on the driven shaft is imposed on the transmission case. As a result, a load acting on the driven shaft, is reduced, to reduce wear of the support portion of the transmission case that rotatably supports the driven shaft, to thereby improve the durability of the support portion.

The invention of the second aspect is a belt type transmission, wherein the fixed pulley piece on the driven side is supported on the transmission case via a bearing provided between the outer periphery of the fixed pulley piece on the driven side, located radially outwards of the driven shaft, and the inner periphery of the transmission case.

According to the invention of the second aspect, the outer periphery of the fixed pulley piece on the driven side is located radially on the outer periphery of the driven shaft, and the bearing is disposed between the outer periphery thereof and the inner periphery of the transmission case. Therefore, the bearing is to support the load of the driven pulley with a larger area, compared to the case where the driven shaft located radially inwards than the outer periphery of the fixed pulley piece on the driven side is supported, and hence, the pressure acting on the constituent of the bearing can be reduced, to reduce the wear. As a result, in addition to the effects of the invention according to the first aspect, the durability of the bearing can be improved, which supports the fixed pulley piece on the driven side on which the load of the driven pulley acts.

The invention of the third aspect is a belt type transmission, wherein the transmission case is composed of a plurality of constructional elements, and the fixed pulley piece on the driven side is supported by a holder, which is one of the plurality of constructional elements, the holder being coupled to another constructional element of the plurality of constructional elements, and overlapping at least partially only the driven pulley, of the driving pulley and the driven pulley, as seen in the direction along the driven shaft.

According to the invention of the third aspect, it is the holder, being the constructional element of the transmission case, that rotationally supports the fixed pulley piece on the driven side, and the holder is coupled to another constructional element of the transmission case. Moreover, as seen in the direction along the driven shaft, the size of the holder is such that it overlaps only the driven pulley at least partially. Therefore, since a coupling portion of the holder with another constructional element can be located in the vicinity of the driven pulley, the rigidity of the holder having a support portion for supporting the fixed pulley piece on the driven side can be increased, thereby enabling suppression of vibration of the driven pulley.

Moreover, since the holder is a member having such a size overlapping only the driven pulley at least partially, vibration can be suppressed by using a material having high rigidity, different from the material of the other constructional element of the transmission case. Furthermore, even if the material has relatively large specific gravity, since the holder itself can be made small, increase in the weight of the transmission case can be suppressed.

As a result, in addition to the effects of the invention of the first or second aspect, vibration of the driven pulley can be suppressed. As a result, wear at the sliding area between the belt and the driven pulley can be further reduced, to thereby improve the durability of the belt and the driven pulley, and further, noise can be reduced. Moreover, freedom in selection of the material increases from a viewpoint of suppression of vibration, without causing a large increase in the weight, thereby enabling further reduction of vibration and noise.

The invention of a fourth aspect is a belt type transmission, wherein the holder is fitted in a housing hole disposed in other constructional element of the plurality of constructional elements.

According to the invention of the fourth aspect, since the holder is fitted in the housing hole disposed in another constructional element of the transmission case, the holder and the constructional element do not overlap each other, and these can be arranged on substantially the same plane. As a result, in addition to the effects of the invention of the third aspect, a smaller transmission case can be obtained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
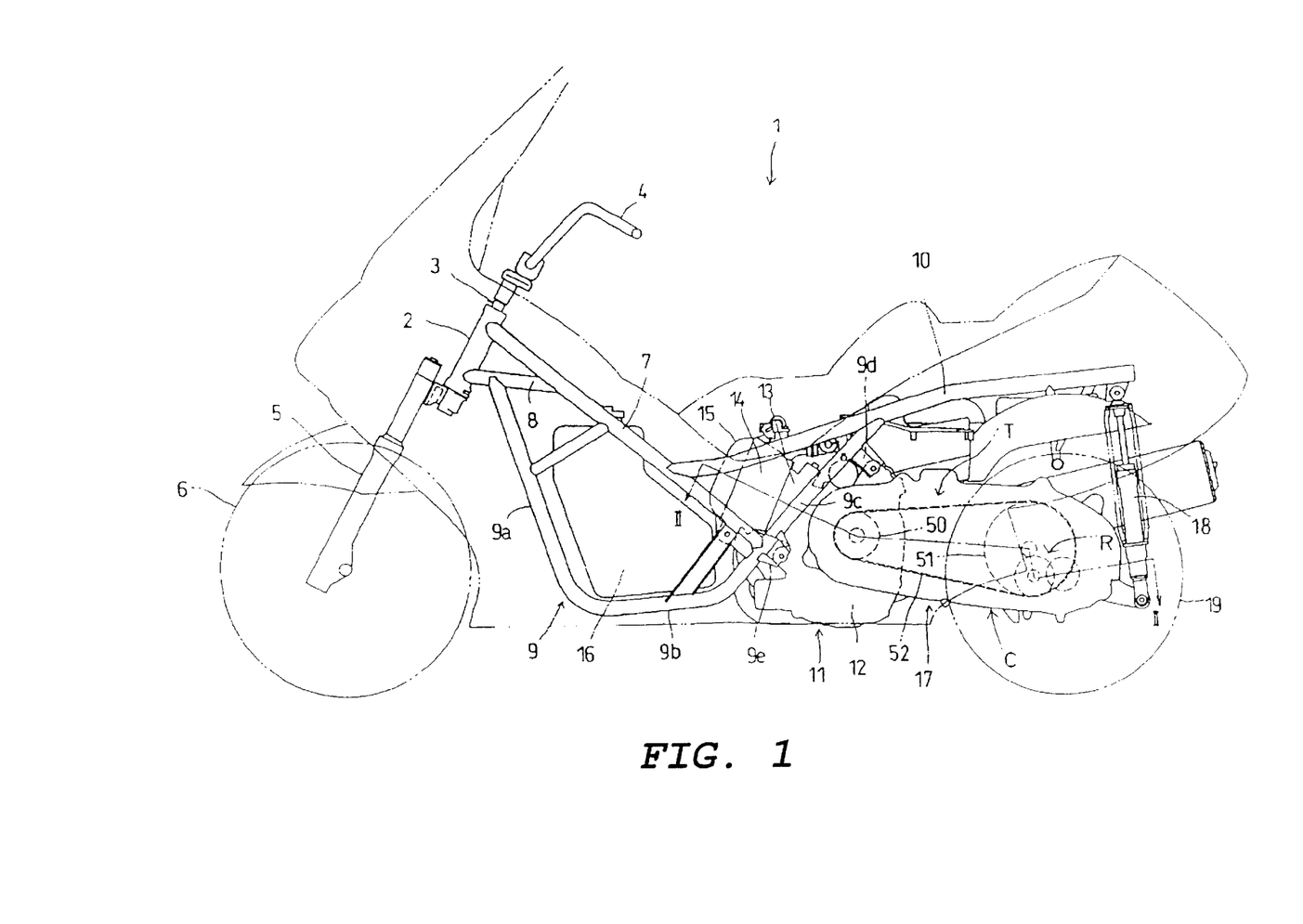
FIG. 1 is a left side view of a motorcycle mounted with a transmission gear comprising a belt-type transmission according to the invention of this application.

Embodiments of the invention of this application will now be described, with reference to FIG. 1 to FIG. 8. FIG. 1 is a left side view of a motorcycle mounted with a belt type transmission according to the invention of this application. A steering shaft 3 is rotatably supported on a head pipe 2 of the motorcycle 1, with a handlebar 4 being fixed to the upper part of the steering shaft 3 and a front fork 5 pivotally supporting the front wheel 6 being fixed to the lower part thereof.

Moreover, the vehicle frame comprises: a pair of left and right main pipes 7 extending downward to the rear from the upper part of the head pipe 2; a pair of left and right support pipes 8 extending substantially horizontally rearward from the lower part of the head pipe 2 and respectively coupled to the main pipes 7; a pair of left and right down pipes 9 respectively coupled to the support pipes 8; and a pair of left and right seat rails 10.

The down pipes 9 comprise front portions 9a that are outspread to the right and left sides, respectively, and extend downward to the rear at an acute angle as compared with the main pipes; central portions 9b bent rearwards at the bottom of the front portions 9a to extend substantially horizontally; and rear portions 9c bent upwards and extending to the rear at the rear part of the central portions 9b. Both seat rails 10 are coupled to a portion slightly towards the rear than the center of the main pipes 7, and extend rearward and slightly upward up to the rear part of the vehicle frame. The rear end of the rear portion 9c of each down pipe 9 is coupled approximately to the central portion of each seat rail 10 for supporting the seat rails 10 from below.

In an internal combustion engine 11, a cylinder block 13, a cylinder head 14 and a cylinder head cover 15 are sequentially superimposed on a crankcase 12, which is arranged rearwardly of the rear portions 9c of the down pipes 9, and are coupled thereto and arranged protruding forwardly of the rear portions 9c of the down pipes 9, in a forward tilted posture facing the front upper side. The crankcase 12 is pivotally supported by a pair of left and right support brackets 9d and 9e disposed respectively on the upper and lower portions in the rear portions 9c of the down pipes 9. In addition, a fuel tank 16 is held, enclosed by left and right main pipes 7 and left and right down pipes 9, in front of the internal combustion engine 11.

On the left side of the vehicle frame, the front part of the transmission gear 17 arranged slightly inclined downwardly to the rear from the left side of the crankcase 12 is rotatably supported on the crankcase 12, designating the axis of the crankshaft 22 as the axis of rotation, as described below, and the rear end thereof is pivotally supported on the rear end of the seat rails 10 on the left side via a bumper 18. As a result, the transmission gear 17 is able to swing vertically with respect to the internal combustion engine 11. Moreover, the rear wheel 19 is pivotally supported on the rear part of the transmission gear 17.

The present invention will now be described in more detail, centering on the internal combustion engine 11 and the transmission gear 17, with reference to FIG. 2 to FIG. 7.

Figure 2:
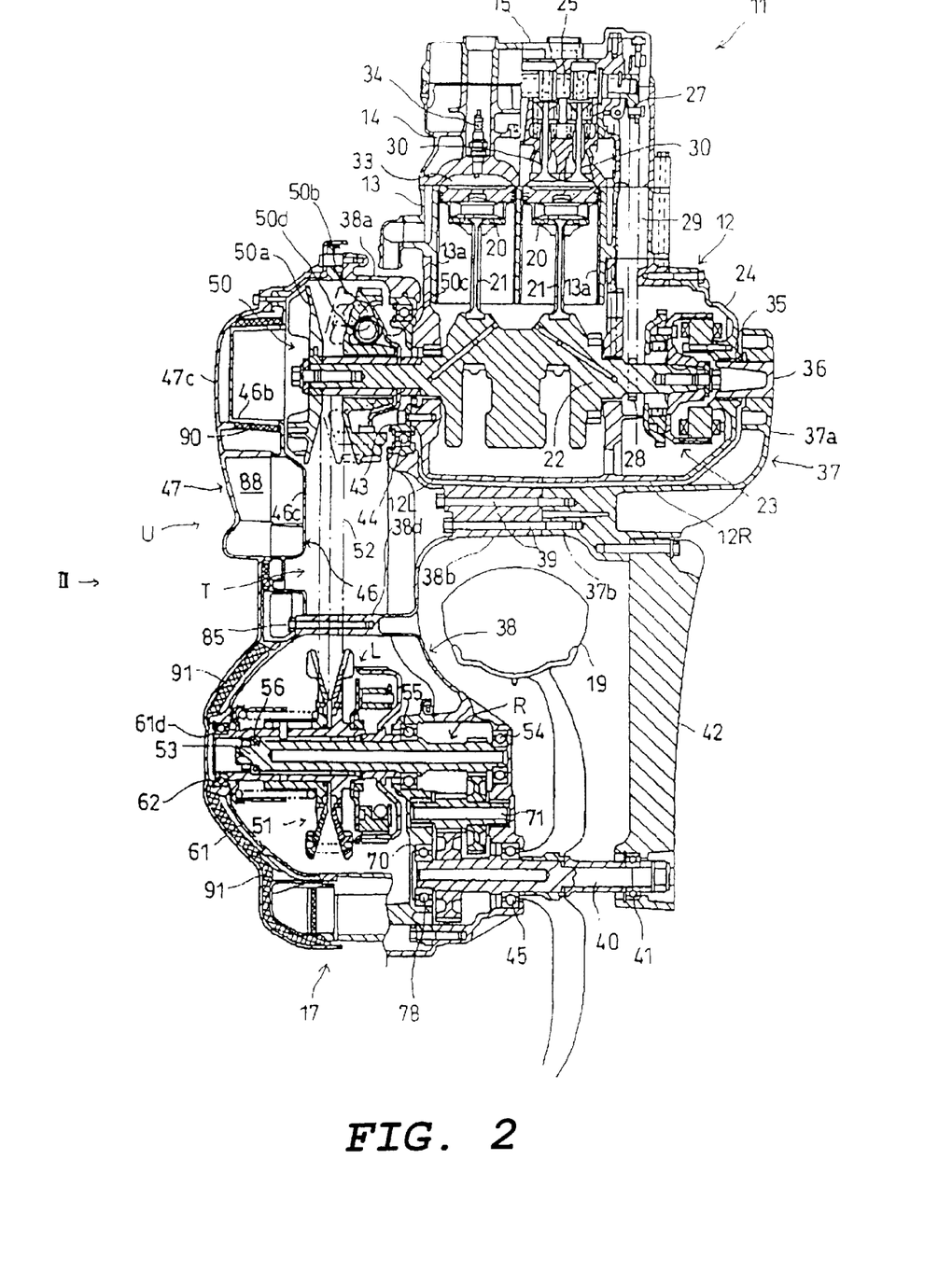
FIG. 2 is a sectional view along the line II—II in FIG. 1.

As shown in FIG. 2, the internal combustion engine 11 is a four-cycle two-cylinder internal combustion engine. The crankcase 12 is distributed to the left and the right and constituted by a left crankcase 12L and a right crankcase 12R. The reciprocating movement of a piston 20 slidably fitted to each cylinder 13a of the cylinder block 13 is transmitted, via connecting rods 21, to the crankshaft 22 rotatably supported on the crankcase, orienting the left and right directions, to thereby rotate the crankshaft 22. A rotor of an AC generator 23 is fixed to the right end portion of the crankshaft 22, and the right side thereof is covered with a generator cover 24 coupled to the crankcase 12R. Moreover, a driving pulley 50 of a V-belt type transmission T, being a constituent of the transmission gear 17 described below, is fitted to the left end portion of the crankshaft 22.

Figure 3:
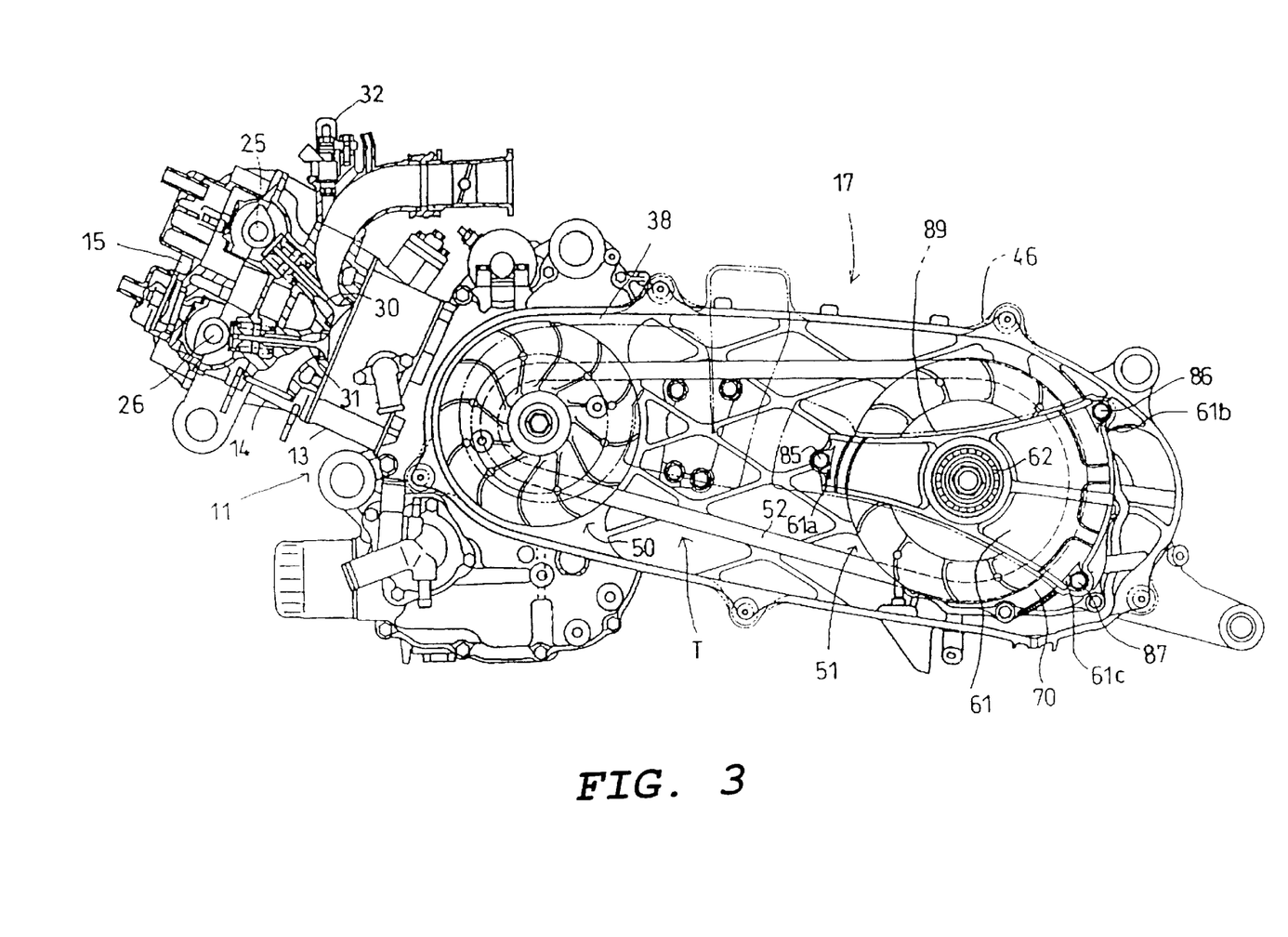
FIG. 3 is a view in the direction of arrow III in FIG. 2, with a cover unit removed.

Also referring to FIG. 3, a valve operating mechanism is provided on the cylinder head 14, and an air intake camshaft 25 and an exhaust camshaft 26 rotatably supported on the cylinder head 14 are rotated at a reduction gear ratio of one half of the crankshaft 22, by a timing chain 29 spanned over driven sprockets respectively fixed to the right end portions of the both camshafts 25, 26 (only a driven sprocket 27 of the air intake camshaft 25 is shown) and a driving sprocket 28 fixed to the right end portion of the crankshaft 22, to thereby drive two inlet valves 30 and two exhaust valves 31 disposed on each cylinder 13a to open, respectively. Then, the fuel injected from a fuel injection valve 32 to an intake path is drawn into a combustion chamber 33, through the inlet valves 30 together with the air, and after the fuel is ignited by a spark plug 34 and burnt, and the burnt gas is exhausted to an exhaust path through the exhaust valves 31.

Next, the transmission gear 17 will be described. A bearing hole consisting of a through hole, with the axis of the crankshaft 22 being the center line, is provided in the generator cover 24 coupled to the right crankcase 12R, and a fitting hole provided on a base end 37a of a right case 37 partially covering the right crankcase 12R is fitted to the right end portion of a support shaft 36, which is rotatably supported by a needle bearing 35 mounted in the bearing hole, to thereby secure the right case 37 on the support shaft 36.

The right case 37 has a junction 37b going around inside of the vehicle frame from the base end portion 37a, along the rear face of the right crankcase 12R, and the junction 37b is fastened by four bolts 39 to a coupling portion 38b of the left case 38, being a constructional element of the transmission case C, which is a constituent of the transmission gear 17, to thereby be coupled integrally with the left case 38. The front end portion of a right fork 42, on the rear end of which the right end of a rear axle 40 is supported via a ball bearing 41, is coupled to the rear part of the right case 37 by a bolt.

An annular support member 43 is coupled by a bolt on the periphery of the crankshaft 22 on the left side of the left crankcase 12L, through which the crankshaft 22 passes. The base end portion 38a of the left case 38 is fitted to the outer periphery of the support member 43 via a ball bearing 44, so that the left case 38 is rotatably supported with respect to the crankcase 12.

The left case 38 has the above-described coupling portion 38b going around inside of the vehicle frame from the base end portion 38a, along the rear face of the left crankcase 12L, further extends rearwards, and supports the middle portion of the rear axle 40 via a ball bearing 45 at the rear. The right case 37 and the right fork portion 42 constituting the right rear fork portion, together with the left case 38 constituting the left rear fork portion, integrally constitute the rear fork of the motorcycle 1, and are supported vertically slidably with respect to the internal combustion engine 11, designating the axis of the crankshaft 22 as the center line.

The left case 38 is open towards the left, and the opened portion is covered with a cover unit U. The cover unit U has a double structure consisting of an inner cover 46, being a constructional element of the transmission case C, which covers the opened portion of the left case 38 and is coupled to the joint face. An outer cover 47, being a constructional element of the transmission case C, covers the inner cover 46 on the left side thereof with a gap and is fastened to the left case 38 by bolts together with the inner cover 46. In the gear chamber formed of the left case 38 and the inner cover 46, there are housed the V-belt type transmission T, a centrifugal clutch L and a reduction gear R, respectively being the constituents of the transmission gear 17, for transmitting the power of the crankshaft 22 to the rear wheel 19.

The transmission T comprises a driving pulley 50, a driven pulley 51, and a V-belt 52 spanned over the both pulleys 50, 51. The driving pulley 50 arranged in the front part of the transmission case C and fitted to the left end of the crankshaft 22 has: a fixed pulley piece 50a on the driving side fixed axially and in the direction of rotation with respect to the crankshaft 22 as a driving axis, and having a conical surface with which the V-belt 52 is brought into contact; a movable pulley piece 50b on the driving side having a conical surface with which the V-belt 52 is brought into contact, and located on the right side of the fixed pulley piece 50a on the driving side and coupled to the crankshaft 22 movably in the axial direction, but not movably in the direction of rotation, with respect to the crankshaft 22; a lamp plate 50c fixed axially and in the direction of rotation with respect to the crankshaft 22; and a plurality of weight rollers 50d arranged between the movable pulley piece 50b on the driving side and the lamp plate 50c.

The driven pulley 51 is disposed at the rear of the transmission case C and fitted to the left end of the driven shaft 53 orienting the left and right directions of the motorcycle 1. This driven shaft 53 is rotatably supported, with the right end thereof supported on the rear part of the left case 38, the middle part supported on a transmission cover 70 described later, and the left end supported on the inner periphery of an inner sleeve 57a described later, respectively, via ball bearings 54, 55 and 56. Here, the ball bearing 54 is a support portion of the driven shaft 53 in the left case 38, and the ball bearing 55 is a support portion of the driven shaft 53 in the transmission cover 70.

Figure 4:
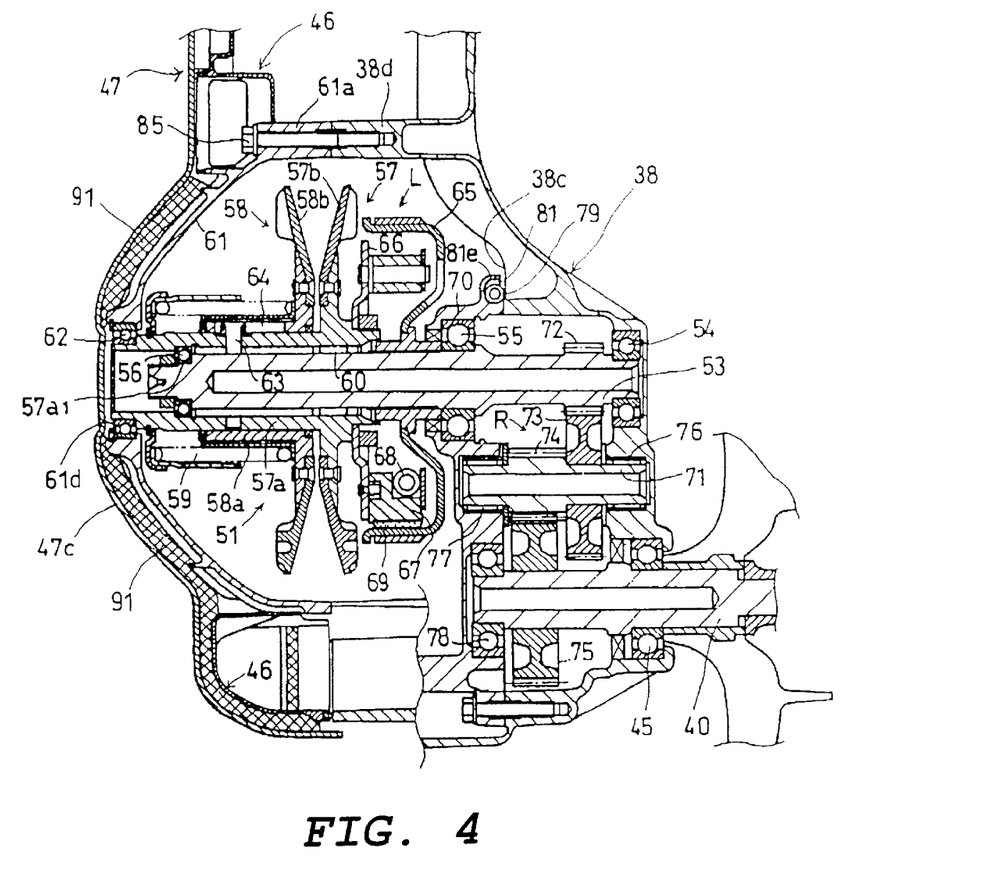
FIG. 4 is an enlarged diagram showing the main part in FIG. 1.

Also referring to FIG. 4, the driven pulley 51 has: a fixed pulley piece 57 on the driven side fixed axially and movable with respect to the driven shaft 53; a movable pulley piece. 58 on the driven side movable axially with respect to the fixed pulley piece 57 on the driven side, and slightly movable in the direction of rotation in the range that a cam groove 64 described later is formed; and a spring 59 consisting of a cylindrical compression coil spring, for energizing the movable pulley piece 58 on the driven side towards the fixed pulley piece 57 on the driven side by means of a spring force.

The fixed pulley piece 57 on the driven side comprises: the inner sleeve 57a arranged coaxially with the driven shaft 53 and radially outwards; and a conical plate 57b having a conical surface integrally fixed on the right end of the inner sleeve 57a, with which the V-belt 52 is brought into contact. The right end of the inner sleeve 57a is rotatably supported on the driven shaft 53 via a needle bearing 60 arranged on the inner periphery thereof, and a journal assembly $57a_1$ located on the outer periphery of the left end portion of the inner sleeve 57a and radially outwards of the driven shaft 53 is inserted into the ball bearing 62 mounted on the inner periphery of a bearing hole 61 d disposed in a bearing holder 61, which is a constructional element of the transmission case C, to thereby be supported rotatably on the bearing holder 61. As a result, the ball bearing 62 is a support portion of the fixed pulley piece 57 on the driven side in the bearing holder 61.

The movable pulley piece 58 on the driven side comprises: an outer sleeve 58a coaxial with the driven shaft 53 and fitted slidably on the outer periphery of the inner sleeve 57a in the axial direction and in the direction of rotation of the driven shaft 53; and a conical plate 58b having a conical surface integrally fixed on the right end of the outer sleeve 58a, and located on the left side of the conical plate 57b of the fixed pulley piece 57 on the driven side, with which the V-belt 52 is brought into contact. On the outer sleeve 58a, there is provided the cam groove 64 having a slope, which engages with a pin 63 fixed on the inner sleeve 57a to enable axially relative movement of the movable pulley piece 58 on the driven side with respect to the fixed pulley piece 57 on the driven side, and enable movement in the direction of rotation and axially, when the difference in the speed of rotation between the fixed pulley piece 57 on the driven side and the movable pulley piece 58 on the driven side is a predetermined value or larger, so that the fixed pulley piece 57 on the driven side and the movable pulley piece 58 on the driven side can normally rotate integrally. Since the outer sleeve 58a slides on the outer periphery of the inner sleeve 57a, the sliding face on the outer periphery of the inner sleeve 57a is subjected to a surface treatment for improving the wear resistance, for example, hard chrome plating. Therefore, the journal assembly $57a_1$ of the inner sleeve 57a, on which the ball bearing 52 is mounted, can be also easily subjected to hard chrome plating, and thereby wear of the journal assembly 57a is reduced to improve the durability.

Since the transmission T is constructed in this manner, when the speed of rotation of the internal combustion engine 11 is small, with the driving pulley 50, the movable pulley piece 50b on the driving side is away from the fixed pulley piece 50a on the driving side, and the wrapping radius of the V-belt 52 decreases. With the driven pulley 51, since the movable pulley piece 58 on the driven side energized by the spring 59 approaches the fixed pulley piece 57 on the driven side to increase the wrapping radius of the V-belt 52, power of the crankshaft 22 can be transmitted to the output shaft with a large change gear ratio.

When the speed of rotation increases, with the driving pulley 50, since the plurality of weight rollers 50d move radially outwards due to the centrifugal force to push the movable pulley piece 50b on the driving side to approach the fixed pulley piece 50a on the driving side, the wrapping radius of the V-belt 52 increases. With the driven pulley 51, since the movable pulley piece 58 on the driven side is away from the fixed pulley piece 57 on the driven side against the spring force, to thereby decrease the wrapping radius of the V-belt 52, the change gear ratio decreases.

A centrifugal clutch L is provided on the driven shaft 53 as a starting clutch, on the right side of the fixed pulley piece 57 on the driven side, between the fixed pulley piece 57 on the driven side and the transmission cover 70 forming the transmission chamber in which the reduction gear R described later is housed. The centrifugal clutch L has a bowl shaped clutch outer 65 fixed on the driven shaft 53 for rotating integrally with the driven shaft 53, and a drive plate 66 fixed to the right end portion of the inner sleeve 57a for integrally rotating therewith, inside of the clutch outer 65. When the inner sleeve 57a rotates at a larger speed of rotation than a predetermined speed of rotation, a plurality of clutch shoes 67 slidably supported on the drive plate 66 swing radially outwards against the spring force of the clutch spring 68, due to the centrifugal force, thereby a wear member 69 disposed on the outer circumference of each clutch shoe 67 abuts against the inner circumference of the clutch outer 65 to make the centrifugal clutch L connected condition, and hence, the rotation of the driven pulley 51 is transmitted to the driven shaft 53.

The driven shaft 53 is driven by a series of gears constituting the reduction gear R and connected to the rear axle 40. At the rear of the transmission case C, in the gear chamber, there is further provided a transmission chamber disposed between the rear part of the left case 38 and the centrifugal clutch L, and formed by the transmission cover 70, being a constructional element of the transmission case C. The reduction gear R housed in the transmission chamber comprises: a first small gear 72 having a small diameter, disposed at the right end of the driven shaft 53 passing through the transmission cover 70; a first reduction gear 73 having a large diameter and a second small gear 74 having a small diameter disposed on an intermediate shaft 71, with the opposite ends thereof rotatably supported on the left case 38 and the transmission cover 70, respectively, via the needle bearings 76, 77; and a second reduction gear 75 having a large diameter disposed on the rear axle 40 rotatably supported on the left case 38 and the transmission cover 70, respectively, via the needle bearings 45, 78. The first small gear 72 meshes with the first reduction gear 73, and the second small gear 74 meshes with the second reduction gear 75, thereby the rotation of the driven shaft 53 is decelerated in two stages and transmitted to the rear axle 40.

Due to such a construction of the transmission gear 17, the power of the crankshaft 22 is input to the driving pulley 50 of the transmission T, and the speed is automatically changed by the transmission T at a change gear ratio in response to the speed of rotation of the internal combustion engine 11 and transmitted to the driven pulley 51, and further transmitted to the driven shaft 53 via the centrifugal clutch L. The speed of rotation of the driven shaft 53 is reduced via the reduction gear R, and transmitted to the rear axle 40.

In the transmission chamber, lubricating oil is collected, and a part of the series of gears constituting the reduction gear R is immersed in this collected lubricating oil to lubricate these gears. Therefore, there is provided a breather mechanism for communicating the transmission chamber with the outside air, to prevent a pressure increase in the transmission chamber, when the temperature of the lubricating oil increases at the time of operating the transmission gear 17.

With the breather mechanism comprising a breather tube connected to the transmission chamber disposed in the gear chamber, the breather tube has been taken out from the transmission case at a position towards the rear wheel, in the left and right directions of the motorcycle, and a part thereof passes the vicinity of the rear wheel. Accordingly, it has been necessary to protect the breather tube by fixing it with a clamp or the like, so that the breather tube does not come to contact with the rear wheel due to vibration or the like. As a result, there is a problem in that the number of parts increases, and assembly is not straightforward.

Figure 5:
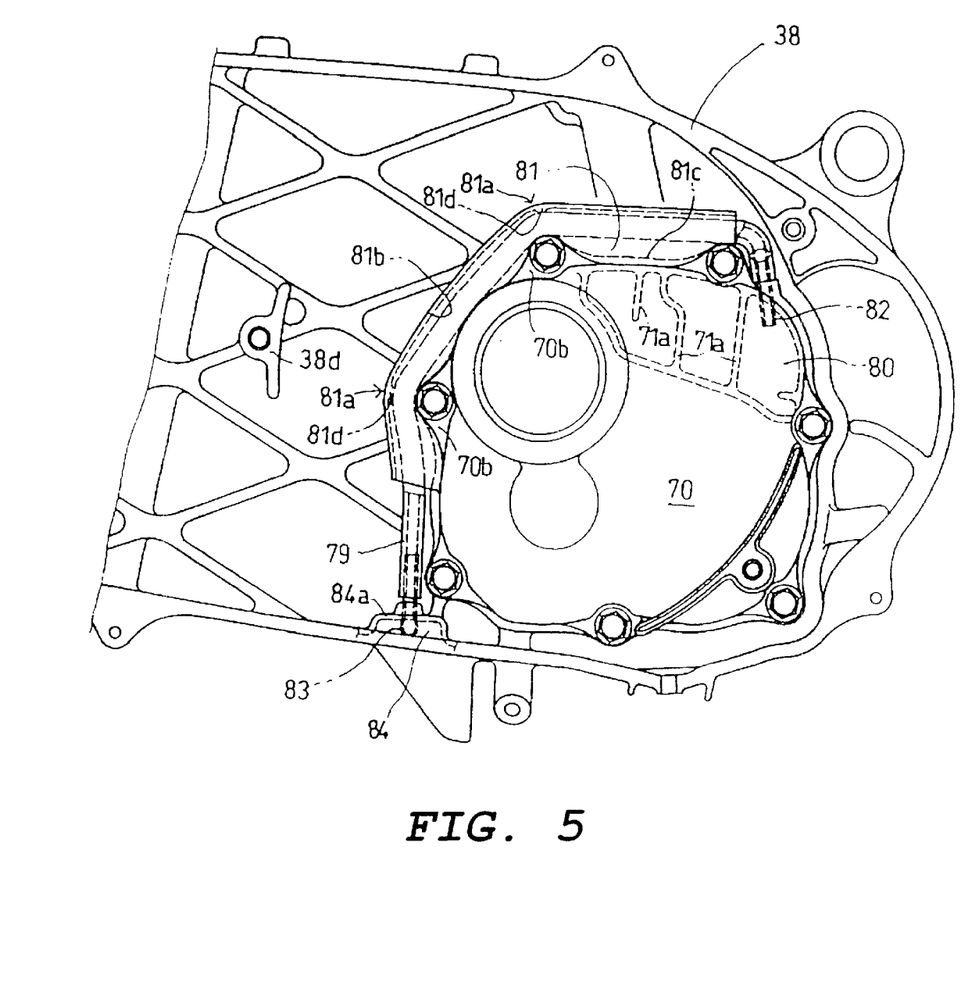
FIG. 5 is a left side view when a transmission cover is fitted to an outer case.

In this embodiment, there is adopted such a retention structure of the breather tube 79 that contact with the rear wheel 19 or the like is prevented by not exposing the breather tube 79 from the transmission case, and another member for retaining the breather tube 79 is not required. The breather mechanism comprises, as shown in FIG. 5, a breather chamber 80 that forms a labyrinth between the left case 38 and itself, by a plurality of partition boards 71a disposed inside of the transmission cover 70, and the breather tube 79 leading to the breather chamber 80 and housed in a guide groove 81 disposed on the outer circumference of the transmission cover 70 and led to the outside air.

The breather tube 79 is press-fitted into the transmission cover 70 at the end portion on the breather chamber 80 side and connected to a first connecting pipe 82 open to the breather chamber 80, and at the end portion on the outside air side, press-fitted into a ceiling wall 84a of a concave portion 84 disposed at the bottom of the left case 38 so as to open downwards, and connected to a second connecting pipe 83 open to the outside air in the concave portion 84. As shown in FIG. 4, the guide groove 81 open towards the inner wall face 38c of the left case 38 is formed by integrated molding with the transmission cover 70, in the vicinity of the joint face of the transmission cover 70 with the left case 38, and bent from the upper part of the transmission chamber in which the breather chamber 80 is located, along the outer circumference of the transmission cover 70, to extend over the range up to the position facing the concave portion.

A plurality of bends 81*a* (two in this embodiment) are provided in the guide grove 81, and in each bend 81*a*, on the inner wall face 81*b* on the outer circumference side of the guide groove 81, there are formed protruding portions 81*d* protruding towards the inner wall face 81*c* on the inner circumference side of the guide groove 81, consisting of the outer circumference of the transmission cover 70. The breather tube 79 is clamped in a pressed condition between these protruding portions 81*d* and boss portions 70*b* protruding towards the inner wall face 81*b* on the outer circumference side, through which a bolt for fitting the transmission cover 70 on the inner wall face 81*c* on the inner circumference side to the left case 38 is inserted. When the transmission cover 70 is fitted to the left case 38, with the breather tube 79 housed in the guide groove 81, the breather tube 79 is clamped between the inner wall face 38*c* of the left case 38 and the bottom wall face 81*e* of the guide groove 81 facing the left case 38, with a slight pressing force.

As described above, the breather tube 79 is pressed by the protruding portions 81*d* and the boss portions 70*b* in the guide groove 81, while being connected with the first connecting pipe, to thereby be held integrally with the transmission cover 70. Therefore, when the breather tube 79 is assembled on the transmission case C, the transmission cover 70 that is holing the breather tube 79 in advance has only to be fastened to the left case 38 by a bolt, after connecting the breather tube 79 and the second connecting pipe 83. The assembly thereof is quite easy, because it is finished upon completion of the assembly of the transmission cover 70. Moreover, after its assembly, the breather tube 79 is pressed and held between the bottom wall face 81*e* of the guide groove 81 and the inner wall face 38*c* of the left case 38, and also pressed and held between the protruding portions 81*d* and the boss portions 70*b*, and hence, the breather 79 can be held securely with vibration suppressed, and another clamp or the like is not required, to thereby reduce the number of parts.

Furthermore, since the breather tube 79 is arranged in the gear chamber, there are no parts that come into contact with the rear wheel 19. Accordingly, the left case 38 can be located further inside the rear wheel 19, by drawing the transmission chamber towards the rear wheel 19 side, with the left case 38 expanded towards the rear wheel 19 side, and hence, protrusion of the transmission case C towards the left side can be suppressed, thereby enabling a large banking angle.

Next, the bearing holder 61 and the cover unit U coupled to the left case 38 will be described. The bearing holder 61 rotatably supporting the left end portion of the inner sleeve 57*a* of the fixed pulley piece 57 on the driven side has a shape expanding towards the left of the driven pulley 51 so as to cover the driven pulley 51 (see FIG. 2 and FIG. 4), and as shown in FIG. 3, has a substantially fan shape overlapping only the driven pulley 51, of the driving pulley 50 and the driven pulley 51 constituting the transmission T, in a linearly symmetric manner with respect to a straight line connecting the center of the crankshaft 22 and the center of the driven shaft 53, seen in a direction along the driven shaft 53 (hereinafter referred to as "seen in side view").

To this bearing holder 61, one front coupling portion 61*a* protruding rightward towards the left case 38 is disposed on the inside of the V-belt 52, seen in side view, in the vicinity of a part corresponding to a vital point of the fan, located in front of the driven pulley 51, and is fastened to the coupling portion 38*d* protruding leftward from the left case 38 by a bolt 85. Two rear coupling portions 61*b* and 61*c* are disposed at the rear of the driven pulley 51, and of these, the upper rear coupling portion 61*b* is fastened to the left case 38 and the lower rear coupling portion 61*c* is fastened to the mission cover 70, respectively, by bolts 86, 87.

The position of each coupling portion 61*a*, 61*b* and 61*c* is radially outwards of the driven pulley 51, and may be a position where the bearing holder 61 overlaps only the driven pulley 51, of the driving pulley 50 and the driven pulley 51, seen in side view, however, from a viewpoint of increasing the rigidity for supporting the inner sleeve 57*a*, it is to be a position close to the ball bearing 62, which is the support portion of the fixed pulley piece 57 on the driven side in the bearing holder 61, and hence, to be in the vicinity of radially outwards of the driven pulley 51, and a position corresponding to the vicinity of a portion where the expanded portion of the inner cover 46 and the expanded portion of the outer cover 47 start to expand, described later. The bolt hole of each coupling portion 61*a*, 61*b* and 61*c* is located on substantially the same circumference with respect to the center of the driven shaft 53 and the inner sleeve 57*a*.

After the reduction gear R, the transmission cover 70, the driven shaft 53, the centrifugal clutch L and the driven pulley 51 are assembled to the left case 38, the bearing holder 61 mounted with the ball bearing 62 is fitted such that the ball bearing 62 is inserted into the journal assembly $57a_1$ of the inner sleeve 57*a*, and thereafter, is fastened to the left case 38 and the transmission cover 70 by three bolts 85, 86 and 87. This state is shown in FIG. 3.

After the bearing holder 61 is coupled to the left case 38 and the transmission cover 70 in this manner, the cover unit U comprising the inner cover 46 and the outer cover 47 is fastened to the left case 38 by means of a bolt.

Figure 6:
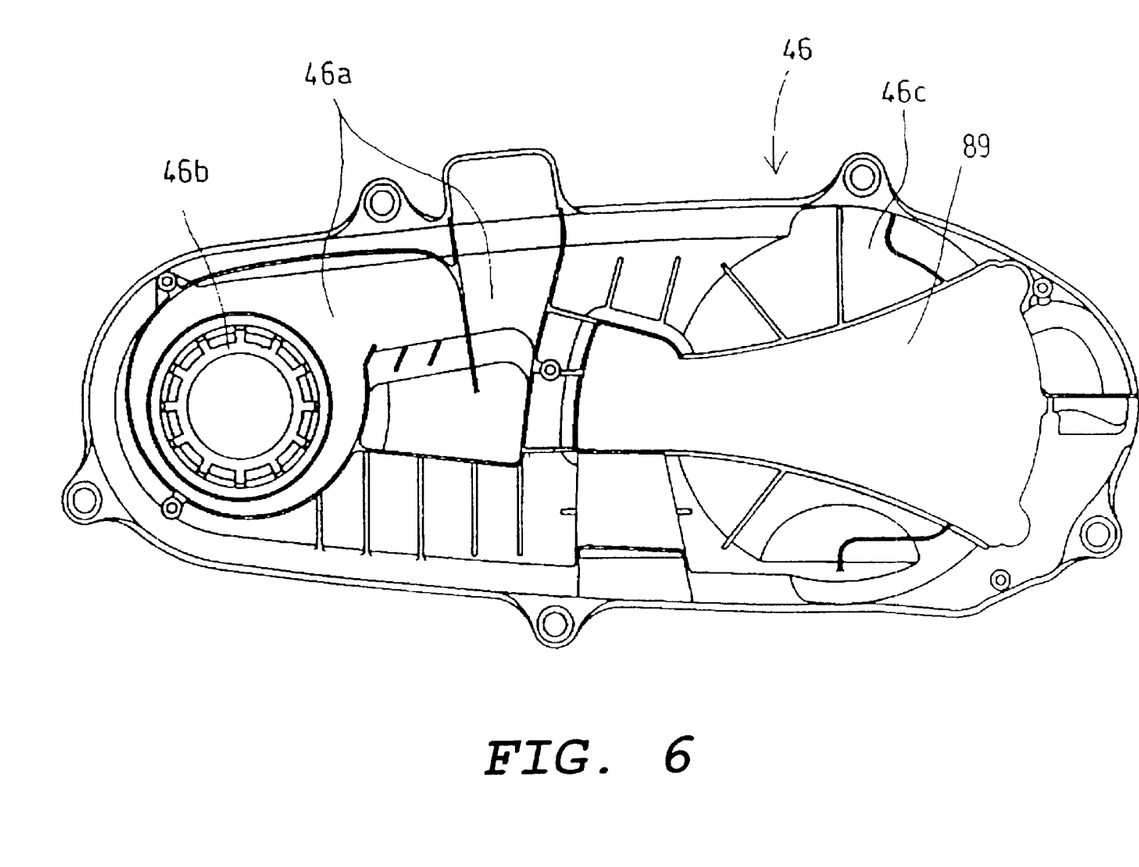
FIG. 6 is a left side view of an inner cover.

As shown in FIG. 6, in this inner cover 46, there are provided at the front thereof, an inside wall 46*a* forming an air passageway 88 of cooling air in a winding shape for cooling the transmission T, and a cylindrical portion 46*b* protruding leftward, and having a circumferential wall on which a plurality of slits are formed, and being open toward the driving pulley 50. An air filter 90 (see FIG. 2) is mounted on this cylindrical portion 46*b*. At the rear of the inner cover 46, an expanded portion 46*c* located at the left of the driven pulley 51 and expanded leftward for covering the driven pulley 51 is disposed. A housing hole 89 having substantially the same shape as that of the bearing holder 61 is disposed in this expanded portion 46*c* so that the bearing holder 61 is fitted therein.

Figure 7:
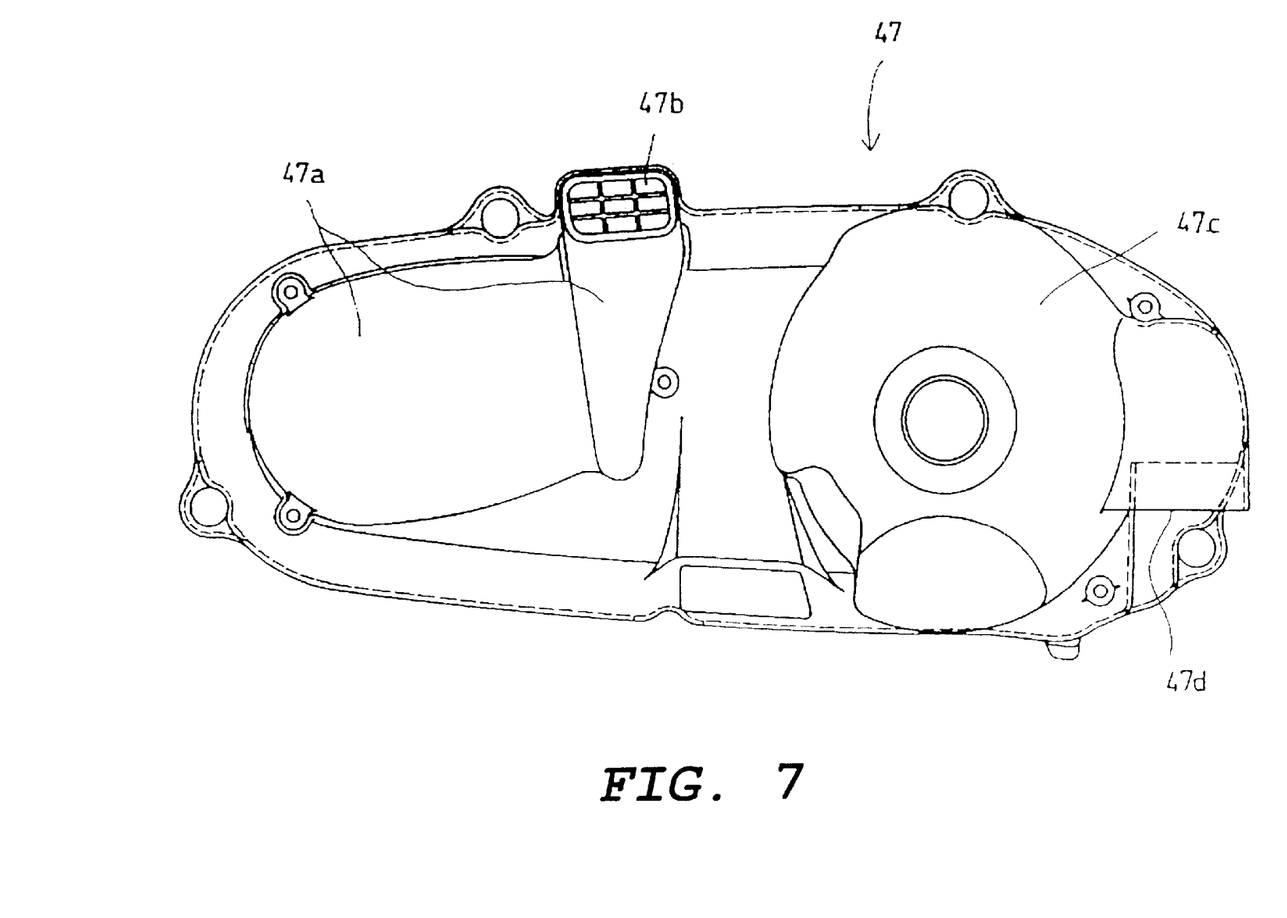
FIG. 7 is a left side view of an outer cover.

Furthermore, as shown in FIG. 7, in this outer cover 47, there are provided at the front thereof, an outside wall 47*a* forming the air passageway 88 in cooperation with the inside wall 46*a* and covering the cylindrical portion, and an opening portion 47*b* forming an air intake for introducing the outside air to the air passageway 88. In addition, an expanded portion 47*c* expanded for covering the expanded portion 46*c* of the inner cover 46 and an opening 47*d* forming an air exhaust port for exhausting the air after cooling to the outside are provided at the rear of the outer cover 47.

Accordingly, the inner cover 46 and the outer cover 47 coupled to each other by bolts in advance are fastened to the left case 38 by bolts, so as to cover the open part of the left case 38 to which the bearing holder 61 is coupled. At this time, since the bearing holder 61 is fitted into the housing hole 89 in the inner cover 46 (in FIG. 3, the rims of the inner cover 46 and the housing hole 89 are shown by a two-dot chain line), the bearing holder 61 and the inner cover 46 do not overlap each other, and both of these can be arranged on substantially the same curved surface, and hence, an expanded shape substantially having no difference in level can be formed by the expanded portion 46c of the inner cover 46 and the bearing holder 61.

At the front of the double-structure cover unit U having such a gap, as shown in FIG. 2, the air passageway 88 having a winding shape is formed by the inside wall 46a and the outside wall 47c, utilizing the gap. Accordingly, when the driving pulley 50 rotates, the air taken in from the opening portion 47b by the fixed pulley piece 50a on the driving side that functions also as a ventilation fan by means of vanes formed on the back face of the driving pulley 50 goes through the air passageway 88, and the air filter 90 to thereby be purified, and thereafter flows into the gear chamber to thereby cool the constituents of the transmission gear 17 such as the V-belt 52 and the transmission T. The air after cooling these constituents flows outside from the opening 47d in the outer cover 47. Water content and dust and dirt in the introduced cooling air are prevented from flowing into the gear chamber by means of this winding air passageway 88 and the air filter 90, to thereby reduce noise leaking to the outside from the gear chamber where the transmission T, the reduction gear R and the like in the gear chamber are housed.

In the rear part of the double-structure cover unit U, at the portion in the expanded shape on the left side of the driven pulley 51, a sound absorbing material 91 is filled between the outer cover 47 and the bearing holder 61 and the inner cover 46 located inside thereof having substantially the same gap between the outer cover 47 and itself, to thereby form a soundproof construction for reducing noise resulting from vibrations due to the transmission T, the reduction gear R or the like housed in the gear chamber.

The operation and the effects of the embodiment constructed as described above will now be described. Since the fixed pulley piece 57 on the driven side of the driven pulley 51 is rotatably supported on the driven shaft 53, which is rotatably supported to the left case 38 and the transmission cover 70, being the constructional elements of the transmission case C, respectively, via the ball bearings 54, 55, and on the bearing holder 61 that is also the constructional element of the transmission case C, respectively, via the needle bearing 60 and the ball bearing 62, a part of the load from the driven pulley 51 that has been heretofore imposed only on the driven shaft 53 is imposed on the bearing holder 61. As a result, load acting on the driven shaft 53 is reduced, to thereby reduce the wear of each ball bearing 54, 55 of the left case 38 and the transmission cover 70, being the support portion for supporting the driven shaft 53, thereby enabling improvement in the durability of these ball bearings 54, 55.

The fixed pulley piece 57 on the driven side is supported by the ball bearing 62 mounted between the journal assembly $57a_1$ located on the outer periphery of the inner sleeve 57a of the fixed pulley piece 57 on the driven side and radially outwards of the driven shaft 53, and the inner periphery of the bearing hole 61d of the bearing holder 61. Therefore, the ball bearing 62 supports the load of the driven pulley 51 with a large area, compared to the case where the driven shaft 53 located radially inwards than the journal assembly $57a_1$ is supported, and hence, the pressure acting on the constituent of the ball bearing 62 can be reduced, to reduce the wear. As a result, the durability of the ball bearing 62 that supports the fixed pulley piece 57 on the driven side on which the load of the driven pulley 51 acts can be improved. The surface treatment for wear resistance applied to the sliding portion of the inner sleeve 57a with the outer sleeve 58a can be applied to the journal assembly $57a_1$ at the same time. Hence, the surface treatment process for the journal assembly $57a_1$ alone is not required, thereby easily enabling improvement in the durability of the journal assembly $57a_1$.

The bearing holder 61 is coupled to the left case 38, being the constructional element of the transmission case C, and seen in plan view, that is, seen from the direction along the driven shaft 53, and has a size overlapping only the driven pulley 51, of the driving pulley 50 and the driven pulley 51 constituting the transmission T. Therefore, the respective coupling portions 61a, 61b and 61c with the bearing holder 61 and the left case 38 and the transmission case 70 can be located in the vicinity of the driven pulley 51, and hence the rigidity of the bearing holder 61 mounted with the ball bearing 62 supporting the fixed pulley piece 57 on the driven side can be increased, thereby enabling suppression of vibration of the driven pulley 51. As a result, wear at the sliding portion between the V-belt 52 and the driven pulley 51 can be further reduced, to further improve the durability of the belt and the driven pulley 51, and also reduce noise.

Since the bearing holder 61 is a member having a size overlapping only the driven pulley 51, vibration and also noise can be suppressed by using a material having high rigidity, different from the material of the inner cover 46 and the outer cover 47, which are other constructional elements of the transmission case C. Furthermore, even if the material has relatively large specific gravity, since the holder itself can be made small, increase in the weight of the transmission case can be suppressed. Freedom in selection of the material increases from a viewpoint of suppression of vibration, without causing large increases in the weight, thereby enabling further reduction of vibration and noise. Based on this effect of reducing vibration and noise, a light material having relatively low rigidity is used for the inner cover 46 and the outer cover 47, to thereby make the motorcycle 1 light.

Since the bearing holder 61 is fitted in the housing hole 89 disposed in the inner cover 46 constituting the cover unit U coupled to the portion open to the left case 38, the bearing holder 61 and the inner cover 46 do not overlap each other, and hence both can be arranged on substantially the same curved surface. As a result, the portion in the expanded shape covering the driven pulley 51 is formed of a double structure consisting of the bearing holder 61 and the outer cover 47, and a double structure consisting of the inner cover 46 and the outer cover 47, and the gap in the both double structures is almost the same, protrusion of the expanded shape portion of the transmission case C towards the left is suppressed. That is to say, the transmission case C is suppressed from becoming large, to thereby be able to take a large bank angle. Furthermore, since the sound absorbing material 91 is filled in these gaps, vibration and noise occurring with the operation of the transmission T, the reduction gear R and the like can be reduced.

In addition, since the breather tube 79 for leading the transmission chamber to the outside air is arranged in the gear chamber, there is no portion that comes in contact with the rear wheel 19. Accordingly, the left case 38 can be located more inside of the rear wheel 19, by drawing the transmission chamber towards the rear wheel 19 side, with the left case 38 expanded towards the rear wheel 19 side. As a result, protrusion of the transmission case C towards the left side can be suppressed. Of the driven pulley 51 and the centrifugal clutch L axially disposed in parallel with respect to the driven shaft 53, the centrifugal clutch L is arranged on the right side of the driven pulley 51. As a result, since the clutch outer 65 having a relatively large diameter in the gear chamber is not arranged on the cover unit U side, protrusion of the expanded portion towards the left is suppressed and the expanded portion is suppressed from having a large diameter.

Figure 8:
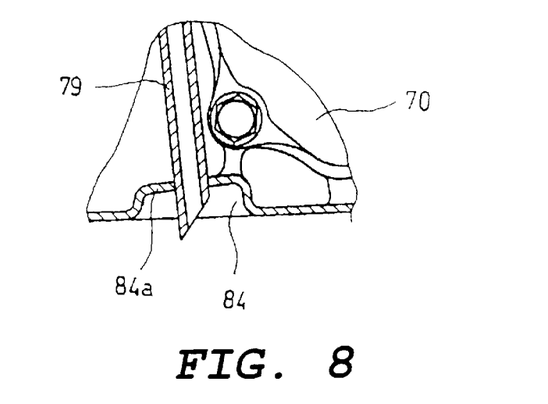
FIG. 8 is a sectional view showing another example of the end portion on the outside air side of a breather tube.

Next, with regard to an embodiment where a part of the construction of the above-described embodiment is modified, the modified construction will be described. In the above-described embodiment, the end portion on the outside air side of the breather tube 79 is connected to the second connecting pipe 83 press-fitted into the left case 38. However, as shown in FIG. 8, the breather tube 79 may be directly press-fitted into the ceiling wall 84a of the concave portion 84 disposed in the left case 38 so as to open in the concave portion 84.

The bearing holder 61 may be a bearing holder having a shape overlapping the whole driven pulley 51, as long as it covers only the driven pulley 51, of the driving pulley 50 and the driven pulley 51.

In the above-described embodiment, the inner sleeve 57a of the fixed pulley piece 57 on the driven side is rotatably supported on the bearing holder 61. However, the member for rotatably supporting the inner sleeve 57a of the fixed pulley piece 57 on the driven side has only to be a constructional element constituting the transmission case C, and for example, may rotatably support the inner sleeve 57a in the inner cover 46, without disposing the bearing holder 61.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A transmission comprising:
    a rotatably supported transmission case;
    a driving pulley having a fixed pulley piece and a movable pulley piece, said driving pulley being fitted to a driving shaft;
    a driven pulley having a fixed pulley piece and a movable pulley piece, said driven pulley being fitted to a driven shaft, wherein said fixed pulley piece on the driven side is rotatably supported, respectively, on said driven shaft and said transmission case; and
    a belt entrained between said driving pulley and said driven pulley for transmitting the power of said driving shaft to said driven shaft, with said driven shaft housed in said rotatably supported transmission case,
    and said transmission case includes a plurality of constructional elements, and said fixed pulley piece on the driven side is supported by a holder, which is one of said plurality of constructional elements, said holder being coupled to another constructional element of said plurality of constructional elements, and at least partially overlapping said driven pulley but not said driving pulley, as seen in the direction along said driven shaft, wherein said holder is fitted in a housing hole disposed in another constructional element of said plurality of constructional elements.

2. The transmission according to claim 1, wherein said fixed pulley piece on the driven side is supported on said transmission case via a bearing provided between the outer periphery of said fixed pulley piece on the driven side located radially outwards of said driven shaft and the inner periphery of said transmission case.

3. A transmission comprising:
    a driving shaft;
    a driving pulley supported by said driving shaft, said driving pulley including a fixed pulley portion and a movable pulley portion;
    a driven shaft, said driven shaft including a first end, a second end and a middle portion between said first and second ends;
    a driven pulley supported by said driven shaft, said driven pulley including a fixed pulley portion and a movable pulley portion;
    a belt entrained around said driving pulley and said driven pulley to transfer rotation of said driving pulley to said driven pulley;
    a transmission case;
    a first portion of said fixed pulley portion of said driven pulley being rotatably supported by said driven shaft; and
    a second portion of said fixed pulley portion of said driven pulley being rotatably supported by said transmission case, and said first end of said driven shaft is supported by said transmission case through said fixed pulley portion.

4. The transmission according to claim 3, further comprising a first bearing rotatably supporting said first portion of said fixed pulley portion of said driven pulley, and a second bearing rotatably supporting said second portion of said fixed pulley portion of said driven pulley.

5. The transmission according to claim 3, wherein said first portion of said fixed pulley portion of said driven pulley is rotatably supported adjacent said first end of said driven shaft.

6. The transmission according to claim 5, wherein said middle portion is located between said first end and said second end, said mid portion being rotatably supported by said transmission case.

7. The transmission according to claim 5, wherein said driven pulley is rotatable with respect to said driven shaft.

8. The transmission according to claim 7, further comprising a clutch for transferring rotation of said driven pulley to said driven shaft.

9. The transmission according to claim 8, wherein said clutch includes a first member fixed to said fixed pulley portion of said driven pulley, and a second member fixed to said driven shaft.

10. The transmission according to claim 9, wherein said first portion of said fixed pulley portion of said driven pulley is rotatably supported adjacent said first end of said driven shaft.

11. The transmission according to claim 10, wherein said driven shaft includes a mid portion located between said first end and said second end, said mid portion being rotatably supported by said transmission case.

12. The transmission according to claim 11, further comprising a first bearing rotatably supporting said first portion of said fixed pulley portion of said driven pulley, and a second bearing rotatably supporting said second portion of said fixed pulley portion of said driven pulley.

13. The transmission according to claim 3, wherein said fixed pulley portion on the driven side is fixed axially with respect to said driven shaft, said fixed pulley portion including an inner sleeve arranged radially outwards and coaxially with respect to the driven shaft, wherein said second end of said driven shaft is rotatably supported by an inner cover through said inner sleeve of said fixed pulley portion.

14. A drive system comprising:
    an engine having a crankshaft rotatably supported within a crankcase; and
    a transmission having a transmission case pivotally supported by said crankcase, said transmission comprising:

a driving pulley supported by said crankshaft, said driving pulley including a fixed pulley portion and a movable pulley portion;

a driven shaft, said driven shaft including a first end and a second end;

a driven pulley supported by said driven shaft, said driven pulley including a fixed pulley portion and a movable pulley portion;

a belt entrained around said driving pulley and said driven pulley for transferring rotation of said driving pulley to said driven pulley;

a first portion of said fixed pulley portion of said driven pulley being rotatably supported by said driven shaft; and a second portion of said fixed pulley portion of said driven pulley being rotatably supported by said transmission case, and said first end of said driven shaft is supported by said transmission case through said fixed pulley portion.

15. The drive system according to claim 14, further comprising a first bearing rotatably supporting said first portion of said fixed pulley portion of said driven pulley, and a second bearing rotatably supporting said second portion of said fixed pulley portion of said driven pulley.

16. The drive system according to claim 14, wherein said first portion of said fixed pulley portion of said driven pulley is rotatably supported adjacent said first end of said driven shaft.

17. The drive system according to claim 16, wherein said driven shaft includes a mid portion between said first end and said second end, said mid portion being rotatably supported by said transmission case.

18. The drive system according to claim 14, further comprising a clutch for transferring rotation of said driven pulley to said driven shaft.

19. The drive system according to claim 18, wherein said clutch includes a first member fixed to said fixed pulley portion of said driven pulley, and a second member fixed to said driven shaft.

20. The transmission according to claim 14, wherein said fixed pulley portion on the driven side is fixed axially with respect to said driven shaft, said fixed pulley portion including an inner sleeve arranged radially outwards and coaxially with respect to the driven shaft, wherein said second end of said driven shaft is rotatably supported by an inner cover through said inner sleeve of said fixed pulley portion.

* * * * *